US011971956B1

United States Patent
Xiao et al.

(10) Patent No.: US 11,971,956 B1
(45) Date of Patent: Apr. 30, 2024

(54) SECONDARY DISTILLATION FOR SELF-SUPERVISED VIDEO REPRESENTATION LEARNING

(71) Applicant: Amazon Technologies, Inc., Seattle, WA (US)

(72) Inventors: Fanyi Xiao, San Jose, CA (US); Joseph P. Tighe, Seattle, WA (US); Davide Modolo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 17/393,150

(22) Filed: Aug. 3, 2021

Related U.S. Application Data

(60) Provisional application No. 63/209,911, filed on Jun. 11, 2021.

(51) Int. Cl.
*G06F 18/214* (2023.01)
*G06F 18/21* (2023.01)
(Continued)

(52) U.S. Cl.
CPC ...... *G06F 18/2148* (2023.01); *G06F 18/2193* (2023.01); *G06N 3/08* (2013.01); *G06T 5/002* (2013.01); *G06T 5/50* (2013.01); *G06V 20/41* (2022.01); *G06T 2207/10016* (2013.01); *G06T 2207/20084* (2013.01)

(58) Field of Classification Search
CPC ... G06F 18/2148; G06F 18/2193; G06N 3/08; G06T 5/002; G06T 5/50;
(Continued)

(56) References Cited

U.S. PATENT DOCUMENTS

2021/0064931 A1\* 3/2021 Yang .................. G06V 20/46
2021/0319266 A1\* 10/2021 Chen .................... G06N 3/08
(Continued)

OTHER PUBLICATIONS

Korbar, Bruno, Du Tran, and Lorenzo Torresani. "Cooperative learning of audio and video models from self-supervised synchronization." Advances in Neural Information Processing Systems 31 (2018), hereafter referred to as Korbar (Year: 2018).*
(Continued)

*Primary Examiner* — Oneal R Mistry
*Assistant Examiner* — Vaisali Rao Koppolu
(74) *Attorney, Agent, or Firm* — Nicholson De Vos Webster & Elliott LLP

(57) ABSTRACT

Techniques for training a visual neural network are described. In particular, the training of the visual neural network may be performed using one or more contrastive learning loss functions including one or more of a visual-to-visual contrastive learning function using the visual neural network on positive and negative video clips according to a first loss function, a secondary-to-secondary contrastive learning a secondary neural network on secondary positive and negative information generated from the positive and negative video clips, and a secondary-to-visual contrastive learning according to a third loss function using the visual neural network on positive and negative video clips and using the secondary neural network secondary positive and negative information generated from the positive and negative video clips.

20 Claims, 12 Drawing Sheets

(51) Int. Cl.
*G06N 3/08* (2023.01)
*G06T 5/00* (2006.01)
*G06T 5/50* (2006.01)
*G06V 20/40* (2022.01)

(58) Field of Classification Search
CPC .......... G06T 2207/10016; G06T 2207/20084; G06V 20/41
See application file for complete search history.

(56) References Cited

U.S. PATENT DOCUMENTS

2021/0319322 A1* 10/2021 Krishnamurthy ....... G06F 16/65
2022/0284321 A1*  9/2022 Yuan ...................... G06N 20/00
2022/0300764 A1*  9/2022 Liu ...................... G06V 20/635

OTHER PUBLICATIONS

R Qian1,2,3 , Tianjian Meng1 , Boqing Gong1, Ming-Hsuan Yang1, Huisheng Wang1, Serge Belongie1,2,3, Yin Cui1, 1-Google Research 2-Cornell University 3-Cornell Tech, "Spatiotemporal Contrastive Video Representation Learning", 2021 IEEE/CVF Conference on Computer Vision and Pattern Recognition (CVPR); (Year: 2021).*
Wang, Jiangliu, et al. "Self-supervised spatio-temporal representation learning for videos by predicting motion and appearance statistics." Proceedings of the IEEE/CVF Conference on Computer Vision and Pattern Recognition. 2019. (Year: 2019).*

* cited by examiner

SECONDARY DISTILLATION FOR SELF-SUPERVISED VIDEO REPRESENTATION LEARNING

CROSS-REFERENCE TO RELATED APPLICATIONS

This application claims the benefit of U.S. Provisional Application No. 63/209,911, filed Jun. 11, 2021, which is hereby incorporated by reference.

BACKGROUND

Supervised learning has enjoyed great successes in many computer vision tasks in the past decade. One of the most important fuel in this successful journey is the availability of large amount of high-quality labeled data. Notably, the ImageNet dataset for image classification, was where it all started for the deep learning revolution in vision. In the video domain, the Kinetics dataset has long been regarded as the "ImageNet for videos" and has enabled the "pretrain-then-finetune" paradigm for many video tasks. Interestingly, though years old, ImageNet and Kinetics are still the to-go datasets for pretraining, at least among those that are publicly available. This shows how much effort is needed to create these large-scale labeled datasets.

BRIEF DESCRIPTION OF DRAWINGS

Various embodiments in accordance with the present disclosure will be described with reference to the drawings.

DETAILED DESCRIPTION

The present disclosure relates to methods, apparatus, systems, and non-transitory computer-readable storage media for using secondary information in self-supervised training. In some embodiments, explicitly distilled secondary information (e.g., motion information) is used into self-supervised video representations. In some embodiments, compared to previous video representation learning methods that mostly focus on learning motion cues implicitly from red-green-blue (RGB) inputs, the representation learned with techniques detailed herein focus more on foreground motion regions and thus generalizes better to downstream tasks. In some embodiments, to achieve this, standard contrastive learning objectives for RGB video clips are enriched with a cross-modal learning objective between a secondary (e.g., motion pathway) and a visual pathway.

To mitigate the reliance on large-scale labeled datasets, self-supervised learning came with the promise to learn useful representations from large amount of unlabeled data. Following the recent success in natural language processing (NLP) (such as BERT, GPT-3, etc.) some research has attempted to find its counterpart in vision. Among them, pioneering research has been conducted in the image domain to produce successful methods like MoCo and SimCLR. Compared to images, large-scale video datasets induce even higher annotation costs, making it even more important to develop effective self-supervised methods to learn generalizable representations for videos. Some recent video approaches attempted to learn such representations by training their models to solve pretext tasks, like predicting the correct temporal order clips, predict future frames and predict whether a video is played at its intrinsic speed. Though successful to a certain extent, these methods do not explicitly make use of motion information derived from the temporal sequence, which has been shown to be important for supervised action recognition tasks.

Detailed herein are embodiments of a novel and non-obvious self-supervised video representation learning approach, to explicitly train networks to model secondary (e.g., motion) cues. Specifically, in some embodiments, the approach consists of two pathways: a main visual pathway that is later used for downstream tasks, and a supporting secondary (e.g., motion, audio, text, etc.) pathway that is only used during training. In some embodiments, these pathways are connected, and a cross-modal contrastive learning objective is used to have the secondary pathway guide its visual counterpart to focus on foreground regions.

Figure 1:
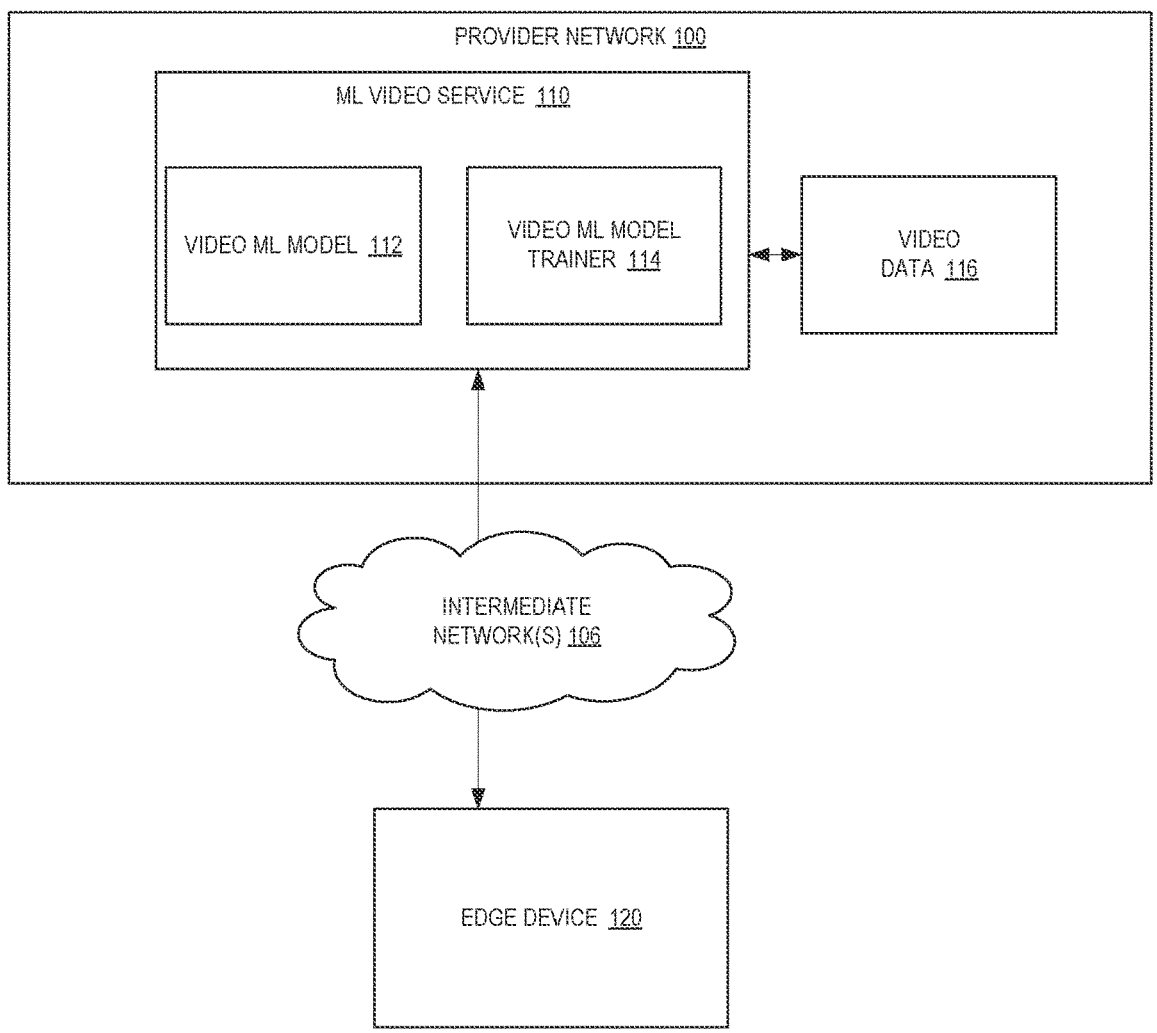
FIG. 1 illustrates embodiments of a machine learning (ML) video service that has been at least pre-trained using secondary data for self-supervised video representation learning.

FIG. 1 illustrates embodiments of a machine learning (ML) video service that has been at least pre-trained using secondary data for self-supervised video representation learning. In particular, a ML video service 110 includes a video ML model 112 (to perform some sort of ML analysis on video) and a video ML model trainer 114 which trains the video ML model 112 based on data 116 including video clips (both positive and negative) and/or secondary data. Details of aspects of that training are discussed below.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 2:
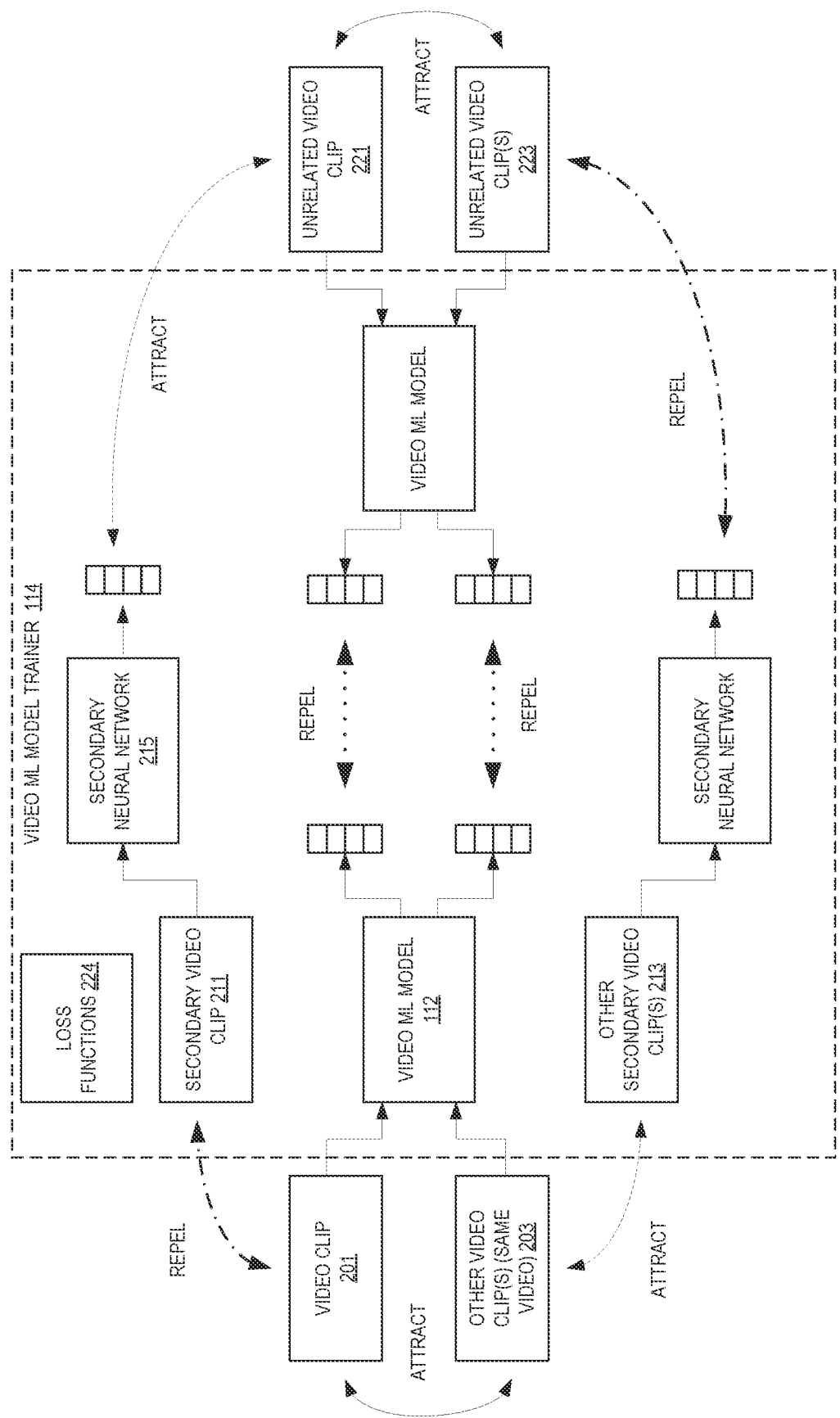
FIG. 2 illustrates embodiments that support the training or pre-training a video ML model using both video clips and/or secondary information (e.g., motion distillation).

FIG. 2 illustrates embodiments that support the training or pre-training a video ML model using both video clips and/or secondary information (e.g., motion distillation). The secondary information is used to learn secondary-aware representations. In some embodiments, the techniques shown in FIG. 2 are used for pre-training and subsequently transferred to a more specific training (e.g., using the something-something dataset, AVA dataset, performing fine-grained classification tasks like classifying different gymnastic action classes, performing video object detection, where the goal is to detect (with bounding boxes) and classify objects appearing in a video, performing pixel-level tasks like video instance segmentation, where the goal is label for each pixel in video frames, the class and its instance ID, etc.).

The neural networks (video ML model 112 and secondary neural network 215) are trained using one of a plurality of contrastive learning objectives (loss functions 224): (i) a visual-only loss that pulls together visual clip embeddings that are sampled from the same video (solid lines) and pushes away that of different videos (dotted lines); (ii) a motion-only loss that operates like (i), but on motion clips (omitted in FIG. 2 to avoid clutter) and (iii) a motion-to-visual loss to explicitly distill motion knowledge from the motion pathway into the visual path way (dashed or dashed-dotted lines). As shown in FIG. 2, positive pairs are generated from clips extracted from the same video (dashed) and negative pairs from clips extracted from different videos (dashed-dotted). After pretraining with this approach, the secondary pathway is disregarded, and the visual pathway may be transferred to target datasets for task-specific fine tuning. In some embodiments, for the visual inputs, random spatial cropping, temporal jittering is applied, p=0.2 probability grayscale conversion, p=0.5 horizontal flip, p=0.5 Gaussian blur, and p=0.8 color perturbation on brightness, contrast and saturation, all with 0.4 jittering ratio. For motion inputs, in some embodiments, flow edge clips are randomly sampled in high motion regions (with motion threshold $\gamma$ set to 0.02) and other augmentations are skipped.

As shown, some embodiments use a two-branch approach consisting of a visual pathway (using video ML model 112) and a secondary (e.g., motion) pathway (using secondary neural network 215) is used in the training. The visual pathway takes as input a video clip 201 from a video and at least one other clip from the video 203 to produce visual embeddings using a neural network 112 (e.g., ResNet-50).

In some embodiments, the secondary pathway operates on motion clips derived from the video clip 201 (shown as secondary video clip 211) and other video clip(s) 203 (shown as other secondary video clip(s) 213) to generate motion embeddings using a secondary neural network 215 (e.g., ResNet-50). Note that the same secondary neural network is used for both types of secondary video clips. In some embodiments, labels for the video clips and secondary information are not needed.

Unrelated video clips 221 and 223 are also fed into the video ML model 112 to generate visual embeddings. Note that unrelated video clips 221 and 223 may come from the same video (in which case they provide attraction information), or they may come from different videos.

In some embodiments, random clips with spatiotemporal jittering are input into one or more of the neural networks (video ML model 112 and/or secondary neural network 215).

There are many ways to represent a motion input. A straightforward way is to directly compute the difference of pixel values between two consecutive frames. While capturing motion to a certain extent, it also captures undesired signals like pixel value shifts caused by background motion. In some embodiments, flow edge maps are used as inputs to the motion pathway network. Specifically, a Sobel filter is applied onto the flow magnitude map to produce the flow edges. In our experiments, this simple operation turns out to produce significantly better motion representations that focus on fore ground motion regions.

In some embodiments, the visual neural network is a 3D ResNet50 structure which features 2D convolutions in res2, res3 and non-degenerate 3D convolutions in res4, res5. In some embodiments, the input is a tensor of size 3×8×224, capturing 8 frames of size 224×224. The sampling stride is 8, which means that the visual input clipspans 8×8 frames, corresponding to ~2 seconds for videos at 30 FPS. In some embodiments, the motion pathway is a 2D ResNet50 and it takes as an input a tensor of size 3×16×2242, stacking 16 motion frames. We use a sampling stride of 4, so that it spans for the same time as the visual input (i.e., ~2 secs).

Figure 3:
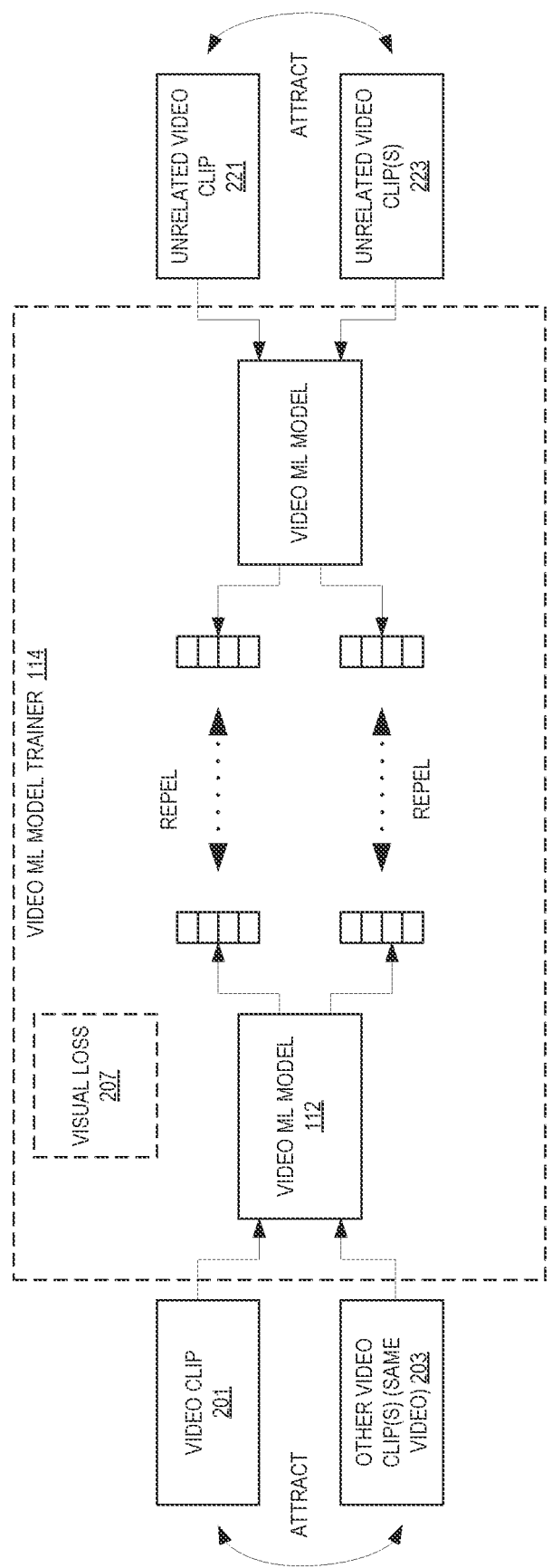
FIG. 3 illustrates embodiments of training or pre-training a video ML model using video clips only.

FIG. 3 illustrates embodiments of training or pre-training a video ML model using video clips only. In some embodiments, the video ML model trainer 114 performs the training and/or pre-training In this configuration, given a clip 201 (which may be random) its embedding $v^q$ (query) is produced using video ML model 112, a second positive clip 203 from the same video is sampled by the video ML model 112 to produce its embedding $v^k$ (key), and N negative embeddings $v_i^n$, $i \in \{1, \ldots, N\}$ are generated from other videos 221 and 223 using the video ML model 112.

The visual pathway (the video ML model 112) is then trained with a loss function 207 using those embeddings. In some embodiments, the loss function is an InfoNCE objective $IN(v^q, v^k, v^n)$ $$\mathcal{L}_v = IN(v^q, v^k, v^n) = -\log \frac{\exp(v^q \cdot v^k / \tau)}{\sum_{i=1}^{N} \exp(v^q \cdot v_i^n / \tau)}$$

where $\tau$ is a configurable temperature parameter. This objective ensures that the visual pathway pulls together embeddings $v^q$ and $v^k$, while pushing away those of all the negative clips $v_i^n$.

Figure 4:
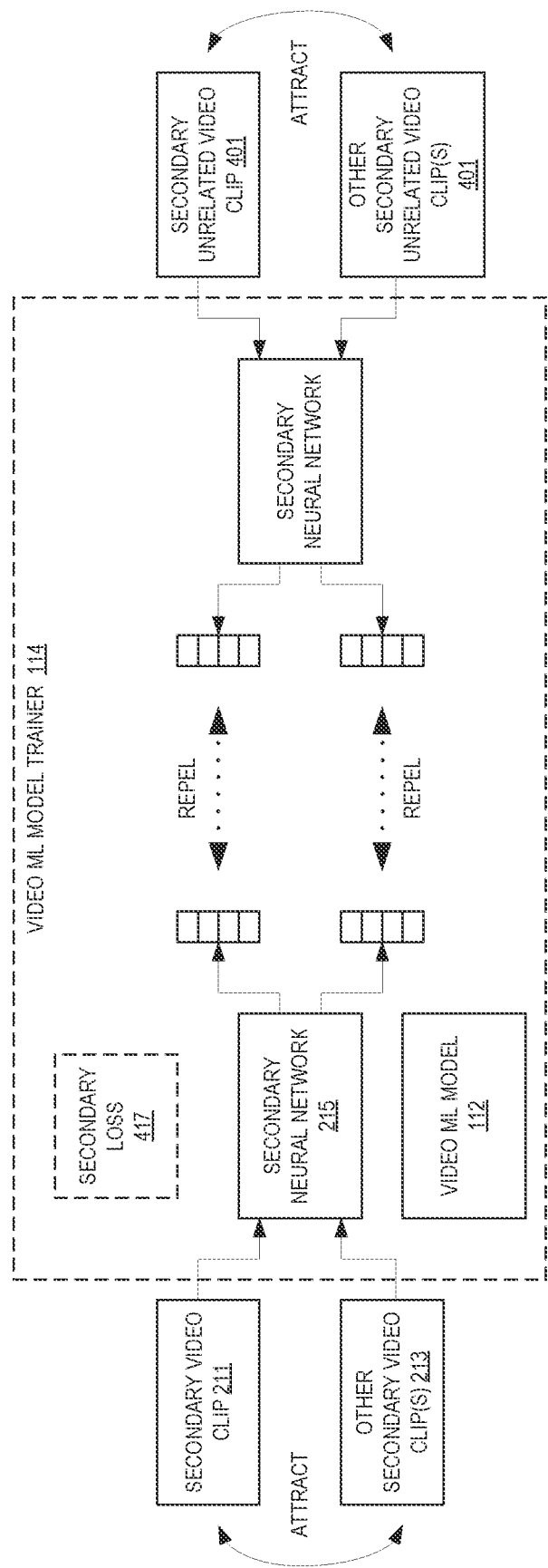
FIG. 4 illustrates embodiments of training or pre-training a video ML model using secondary data only.

FIG. 4 illustrates embodiments of training or pre-training a video ML model using secondary data only. In some embodiments, the video ML model trainer 114 performs the training and/or pre-training. In this configuration, a secondary video clip 211 that is generated from a primary video clip (e.g., clip 201) is applied to the secondary neural network 215 to generate embedding $s^q$ (query), a secondary video clips 213 (generated from the second positive clip 203) is applied to the secondary neural network 215 to generate its embedding $s^k$ (key), and N negative embeddings $s_i^n$, $i \in \{1, \ldots, N\}$ are generated from other secondary videos 401 and 401 using the secondary neural network 215.

For secondary-only learning uses a secondary loss function 417 to train the video ML model 112. In some embodiments, an InfoNCE objective $L_s = IN(s^q, s^k, s^n)$ is used in a similar way to $L_v$, but on secondary embeddings $s^q$, $s^k$ (both are sampled from the same video as $v^q$) and $s^n$. As such, the secondary pathway is able to embed similar motion patterns close to each other.

Figure 5:
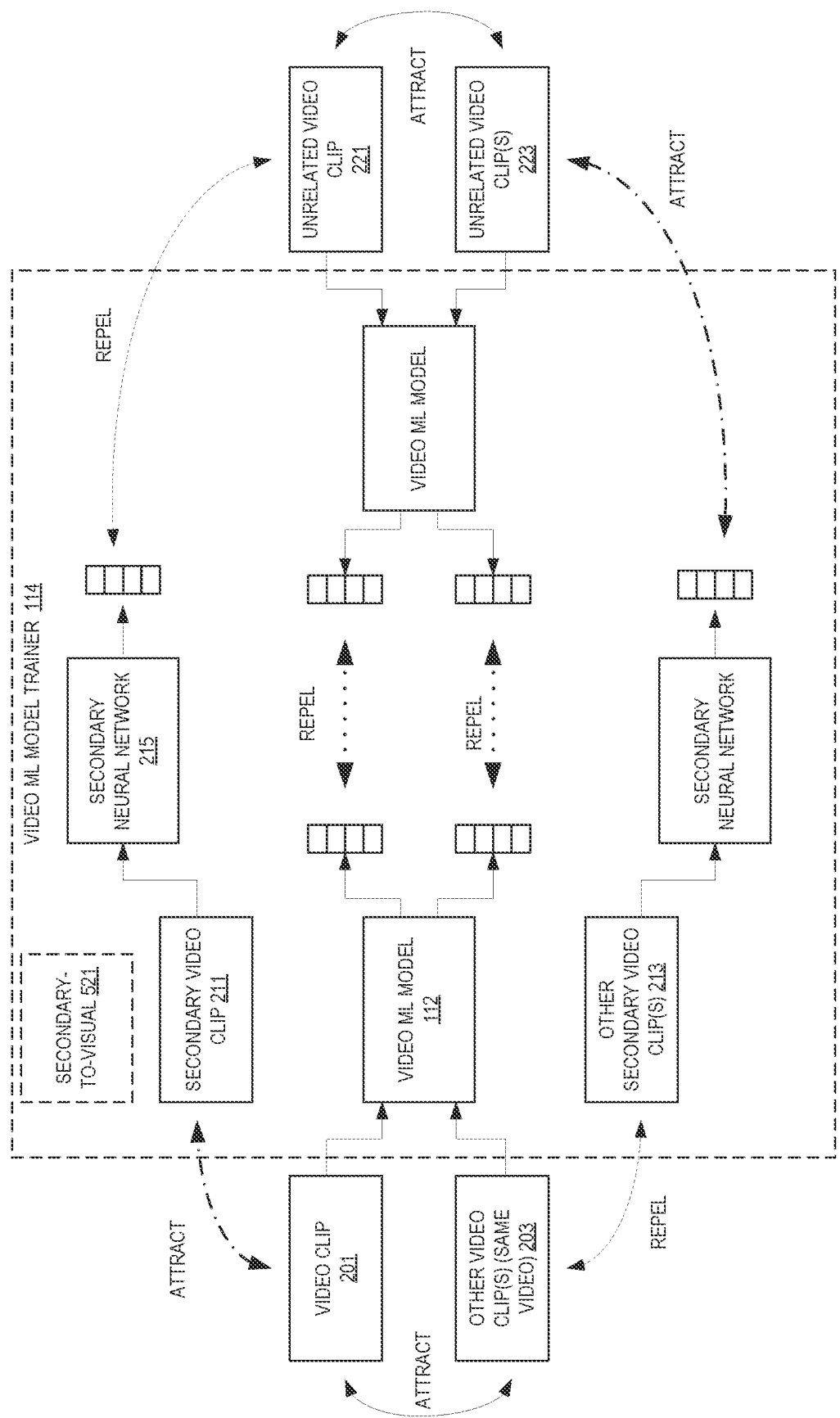
FIG. 5 illustrates embodiments of training or pre-training a video ML model using secondary-to-visual learning.

FIG. 5 illustrates embodiments of training or pre-training a video ML model using secondary-to-visual learning. This also has a contrastive learning objective, but with a different purpose. Here the aim is to distill the secondary information from the secondary pathway into the visual pathway. Specifically, the training uses the following InfoNCE objective $L_{mv} = IN(v^q, s^k, v^n) + IN(s^q, v^k, s^n)$.

In some embodiments, a difference to visual-only contrastive learning is on how motion clips are sampled for both motion-only and motion-to-visual learning. Instead of sampling randomly, only temporal regions with strong motion cues are sampled.

In some embodiments, a final training objective is the sum of all used aforementioned loss functions $L = L_v + L_s + L_{sv}$, $L = L_v$, $L_v = L + L_{sv}$, etc.

As training may be non-trivial, in some embodiments, a memory bank of negative samples is used (stored, in for example, video data 116). Specifically, two memory banks of negative samples for visual and secondary input are constructed and a momentum version of the secondary and visual pathways is updated as a moving average of their online counter points. One caveat is that when pushing negatives into the pool, the video index is pushed along with the embedding, so that sampling visual or motion clips that are from the same video as positive clips are avoided, which would otherwise confuse the network and hurt the representations. Queries are forwarded through the online model and keys through the momentum model to produce embeddings.

Figure 6:
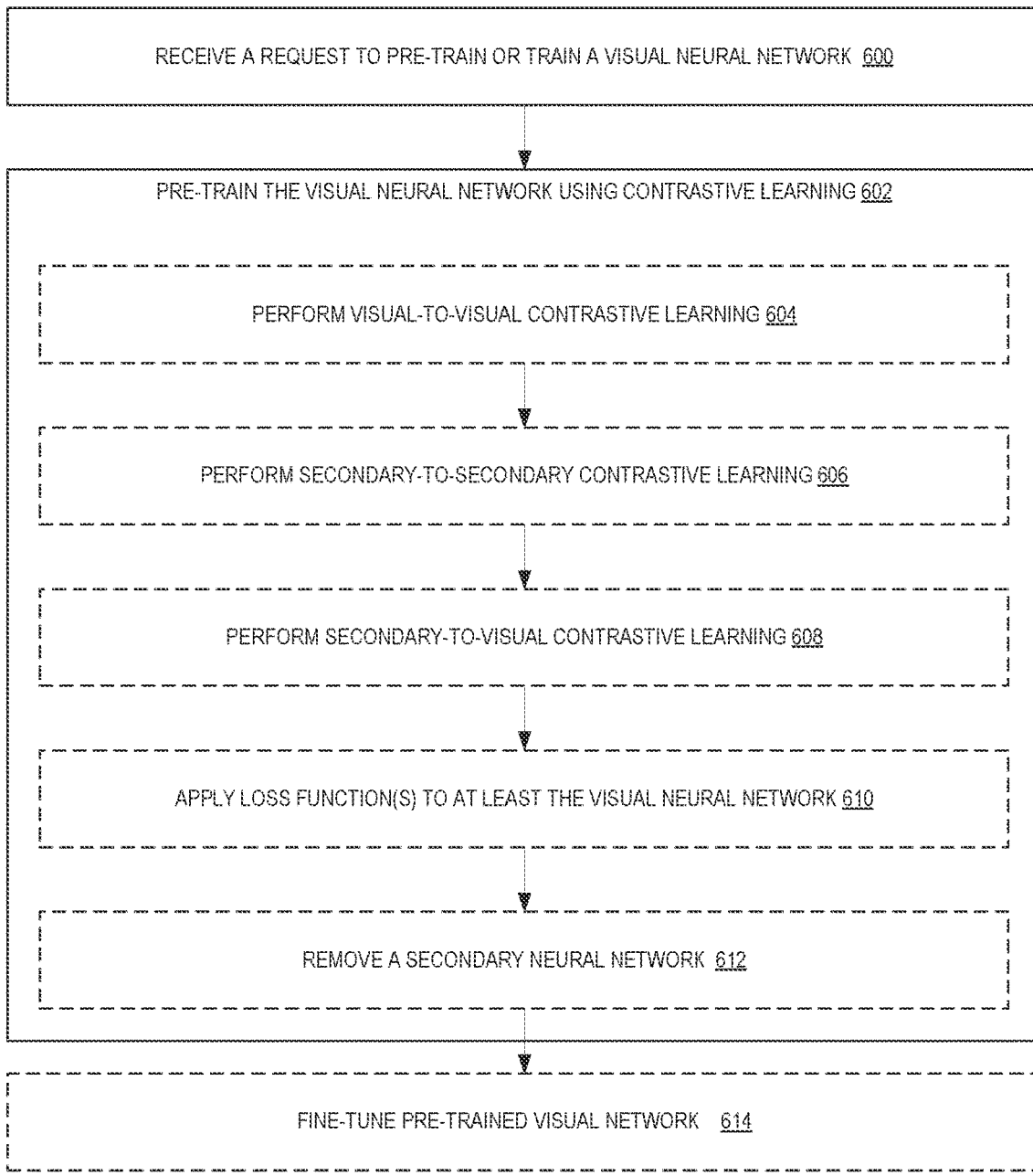
FIG. 6 is a flow diagram illustrating operations of a method for at least pre-training of a visual neural network according to some embodiments.

FIG. 6 is a flow diagram illustrating operations of a method for at least pre-training of a visual neural network according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by video ML model trainer 114 of the other figures.

At 600 a request to pre-train or train a visual neural network is received. The request may include one or more of: an identifier of the algorithm or visual neural network model to pre-train (or train), an algorithm or visual neural network model to pre-train (or train), an identifier of a data set to use in the training for positive video(s), an identifier of a data set to use in the training for negative video(s), a data set to use in the training for positive video(s), a data set to use in the training for negative video(s), an indication of how to generate secondary information, an identifier of secondary information, secondary information, an identifier of a secondary algorithm or model to use to handle secondary information, an indication of how to provide results (e.g., a location to store a pre-trained or trained model, etc.), a temperature, etc.

The visual neural network is pre-trained or trained using contrastive learning at 602. This pre-training (or training if not fine-tuning) uses one or more types of contrastive learning such as visual-to-visual (visual only) at 604, secondary-to-secondary (secondary only) at 606, and/or secondary-to-visual at 608. Examples of such (pre-)training have been detailed above.

In some embodiments, the loss function(s) populated by the contrastive learning(s) is/are applied to at least the visual neural network at 610. In some embodiments, the loss function(s) is/are applied to a secondary neural network as a part of the training process. Note the contrastive learning and loss function application may occur multiple times using different video clips, etc.

In embodiments that utilize a secondary neural network, the secondary neural network is disregared leaving the (pre-)trained visual network to generate results to be used at 612. The disregarding of the secondary neural network may be a removal of the secondary neural network, a disablement of the secondary neural network, an culling of results of running the secondary neural network, etc.

In some embodiments, the pre-trained visual network is fine-tuned at 614. For example, one or more data sets such as the Something-Something dataset (for action recognition), the AVA dataset (for action detection using), video object segmentation, video object detection, video temporal location, etc. is/are used to fine-tune the pre-trained visual network.

Figure 7:
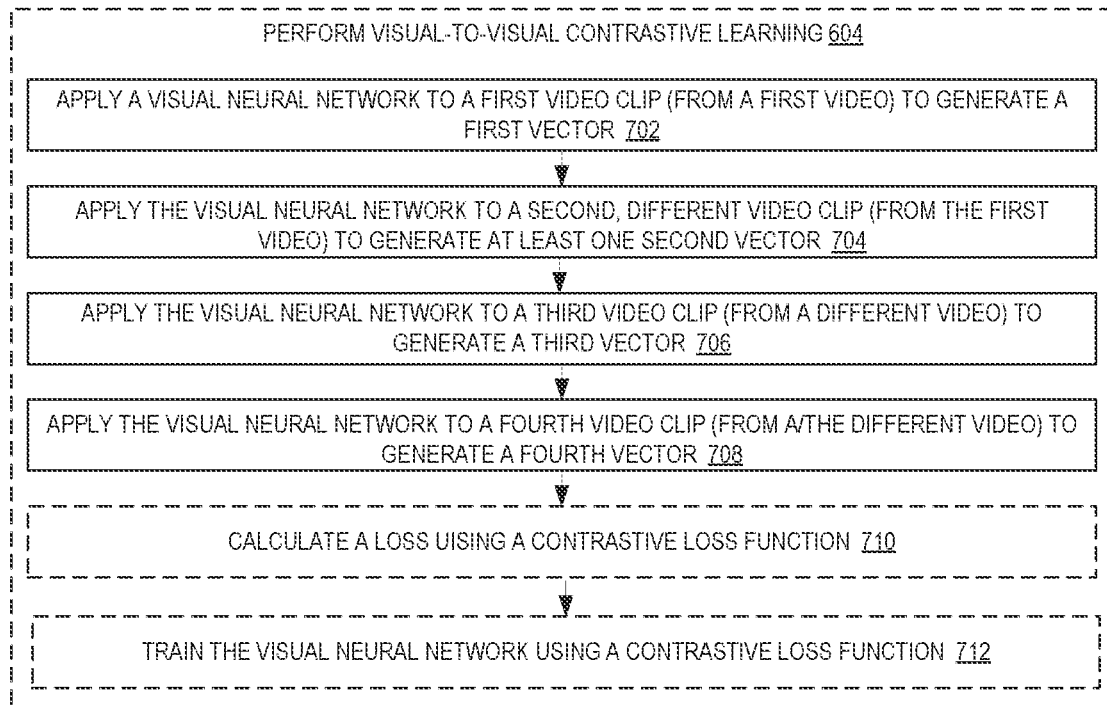
FIG. 7 is a flow diagram illustrating operations of a method for performing visual-to-visual contrastive learning according to some embodiments.

FIG. 7 is a flow diagram illustrating operations of a method for performing visual-to-visual contrastive learning according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by video ML model trainer 114 of the other figures. In some embodiments, this flow represents 604.

A visual neural network is applied to a first video clip (from a first video) to generate a first vector (embedding) at 702. For example, a visual network identified by a (pre-)training request. The visual neural network is also applied to a second, different video clip (from the first video) to generate at least one second vector at 704.

The visual neural network is applied to a third video clip (from a different video) to generate a third vector at 706. This third video clip is a "negative" clip. The visual neural network is applied to a fourth video clip (from a/the different video) to generate a fourth vector at 708. Again, this clip is a negative clip. In some embodiments, a loss is calculated using a video-only contrastive loss function from the embeddings at 710.

In some embodiments, the visual neural network is trained using at least a video-only contrastive loss function which pulls together like embeddings and pushes away negative embeddings at 712. An example of such as function was described with respect to FIG. 3. Note that the clips may be sampled (e.g., randomly).

Figure 8:
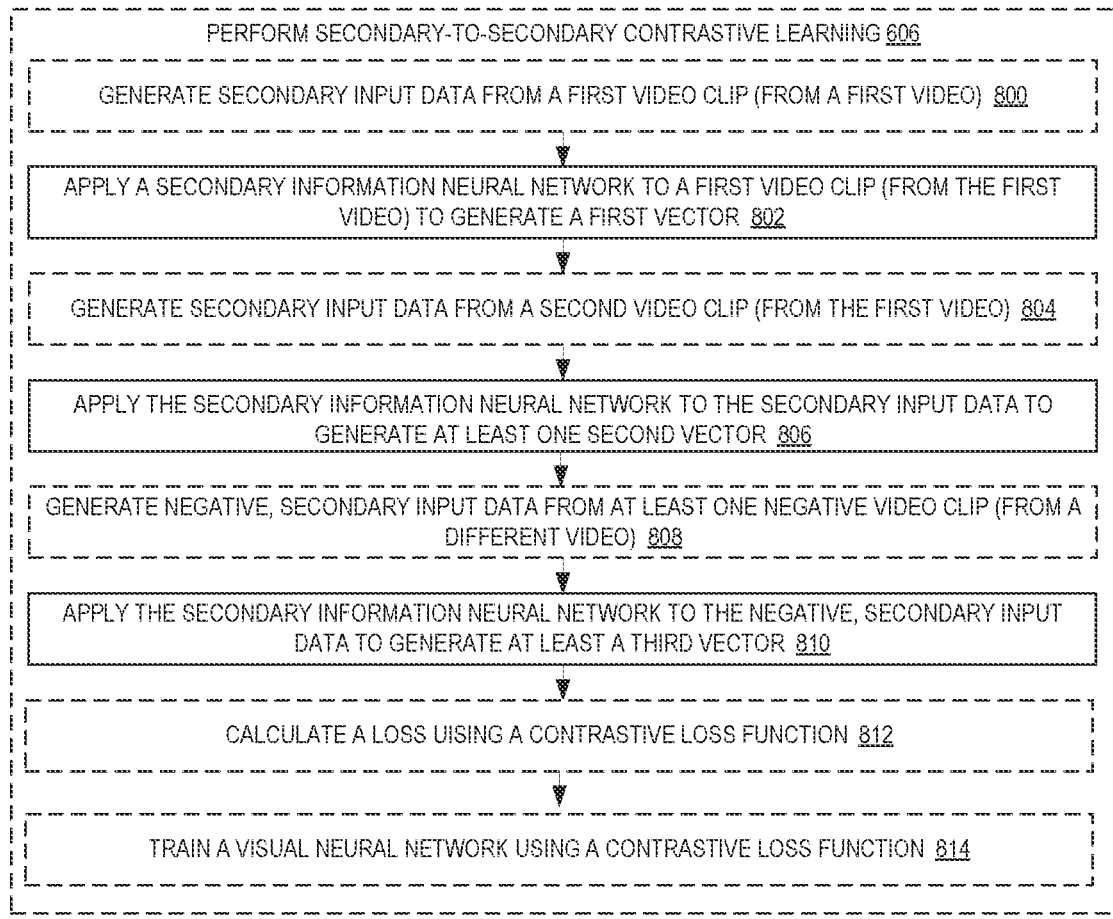
FIG. 8 is a flow diagram illustrating operations of a method for secondary-to-secondary contrastive learning according to some embodiments.

FIG. 8 is a flow diagram illustrating operations of a method for secondary-to-secondary contrastive learning according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by video ML model trainer 114 of the other figures. In some embodiments, this flow represents 606.

In some embodiments, secondary input data is generated from a first video clip (from a first video) at 800. For example, motion video is generated.

A secondary information neural network is applied to a first video clip (from the first video) to generate a first vector (embedding such as a motion embedding) at 802.

Secondary input data from a second video clip (from the first video) is generated at 804 in some embodiments. The secondary information neural network is applied to the secondary input data to generate at least one second vector at 806 to generate a motion embedding.

In some embodiments, negative, secondary input data is generated from at least one negative video clip (from a different video) at 808. The secondary information neural network is applied to the negative, secondary input data to generate at least a third vector at 810.

In some embodiments, a loss is calculated using a secondary-only contrastive loss function from the embeddings at 812.

In some embodiments, at least a secondary neural network is (pre-)trained using at least a secondary-to-secondary contrastive loss function at 814. Note that the clips may be sampled (e.g., using temporal regions with strong secondary (e.g., motion) cues).

Figure 9:
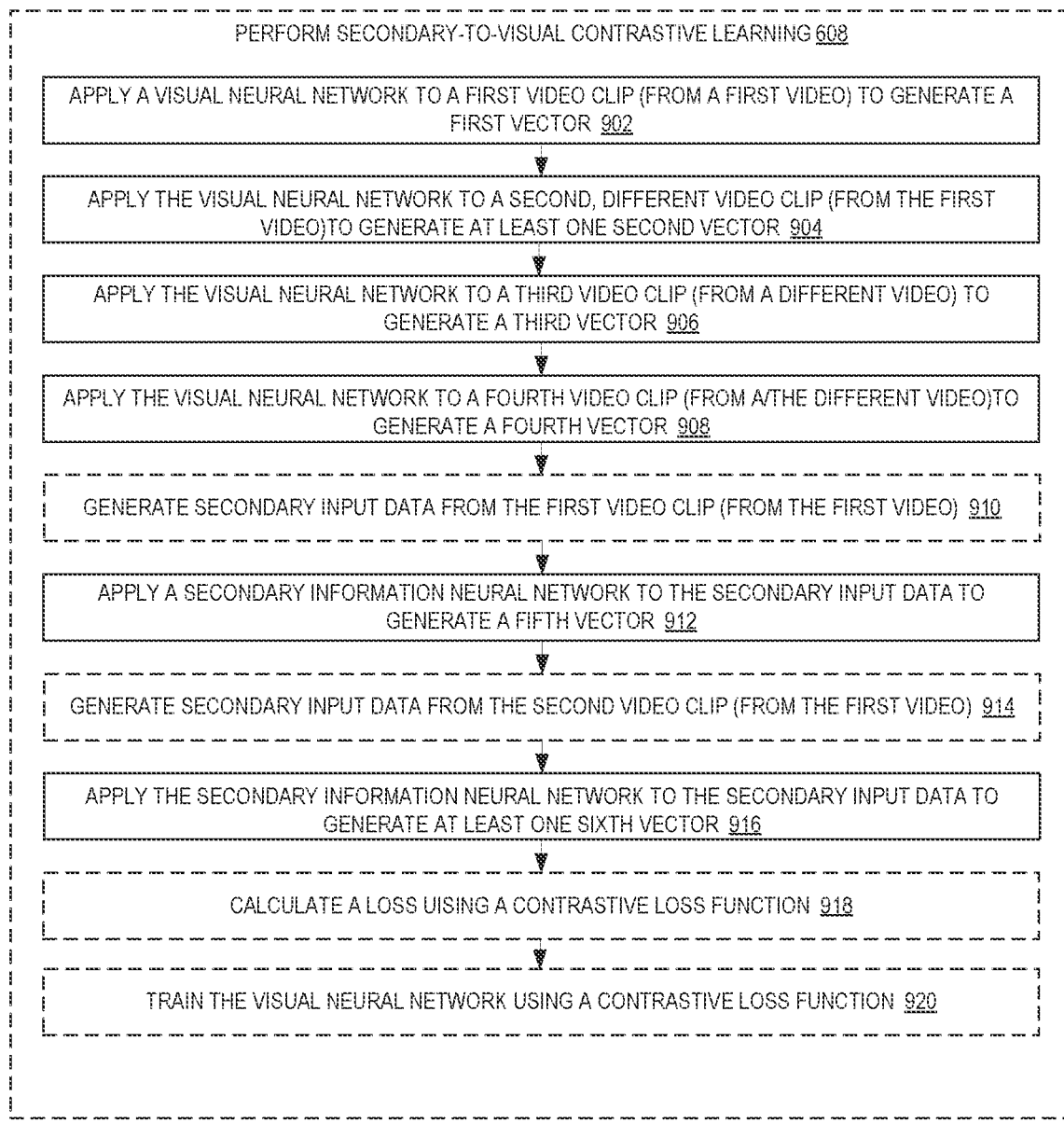
FIG. 9 is a flow diagram illustrating operations of a method for secondary-to-visual contrastive learning according to some embodiments.

FIG. 9 is a flow diagram illustrating operations of a method for secondary-to-visual contrastive learning according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by video ML model trainer 114 of the other figures.

A visual neural network is applied to a first video clip (from a first video) to generate a first vector at 902. The visual neural network is applied to a second, different video clip (from the first video) to generate at least one second vector at 904. These are positive video embeddings.

The visual neural network is applied to a third video clip (from a different video) to generate a third vector at 906. The visual neural network is applied to a fourth video clip (from a/the different video) to generate a fourth vector at 908. These are negative video embeddings.

In some embodiments, secondary input data is generated from the first video clip (from the first video) at 910. A secondary information neural network to the secondary input data to generate a fifth vector at 912. In some embodiments, secondary input data is generated from the second video clip (from the first video) at 914.

The secondary information neural network is applied to the secondary input data to generate at least one sixth vector at 916.

In some embodiments, a loss is calculated using a secondary-to-video contrastive contrastive loss function from the embeddings at 918.

In some embodiments, at least the visual neural network is (pre-trained) using at least t secondary-to-video contrastive loss function at 920.

In some embodiments, a difference between visual-only contrastive learning is on how we sample motion clips for both motion-only and motion-to-visual learning. Instead of sampling randomly, a constraint of only sampling in temporal regions with strong secondary cues. Specifically, we compute the sum of pixels P Pi on the motion input and only sample frames with K i=1 Pi/K>γ, where K is the total number of pixels in a frame and γ is the threshold. This process helps avoid sampling irrelevant regions with no motion and thus leads to better representations.

Figure 10:
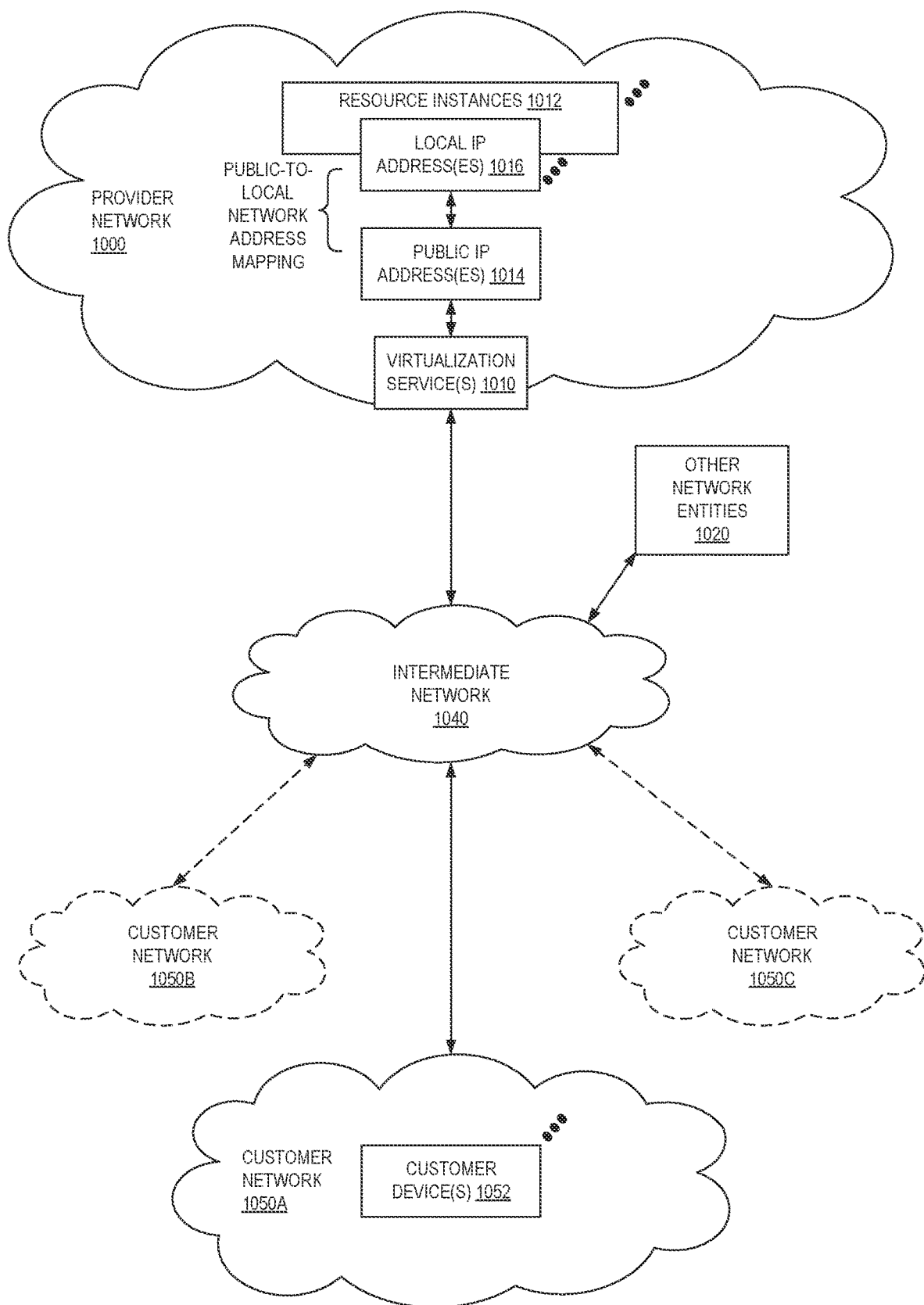
FIG. 10 illustrates an example provider network (or "service provider system") environment according to some embodiments.

FIG. 10 illustrates an example provider network (or "service provider system") environment according to some embodiments. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some embodiments, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
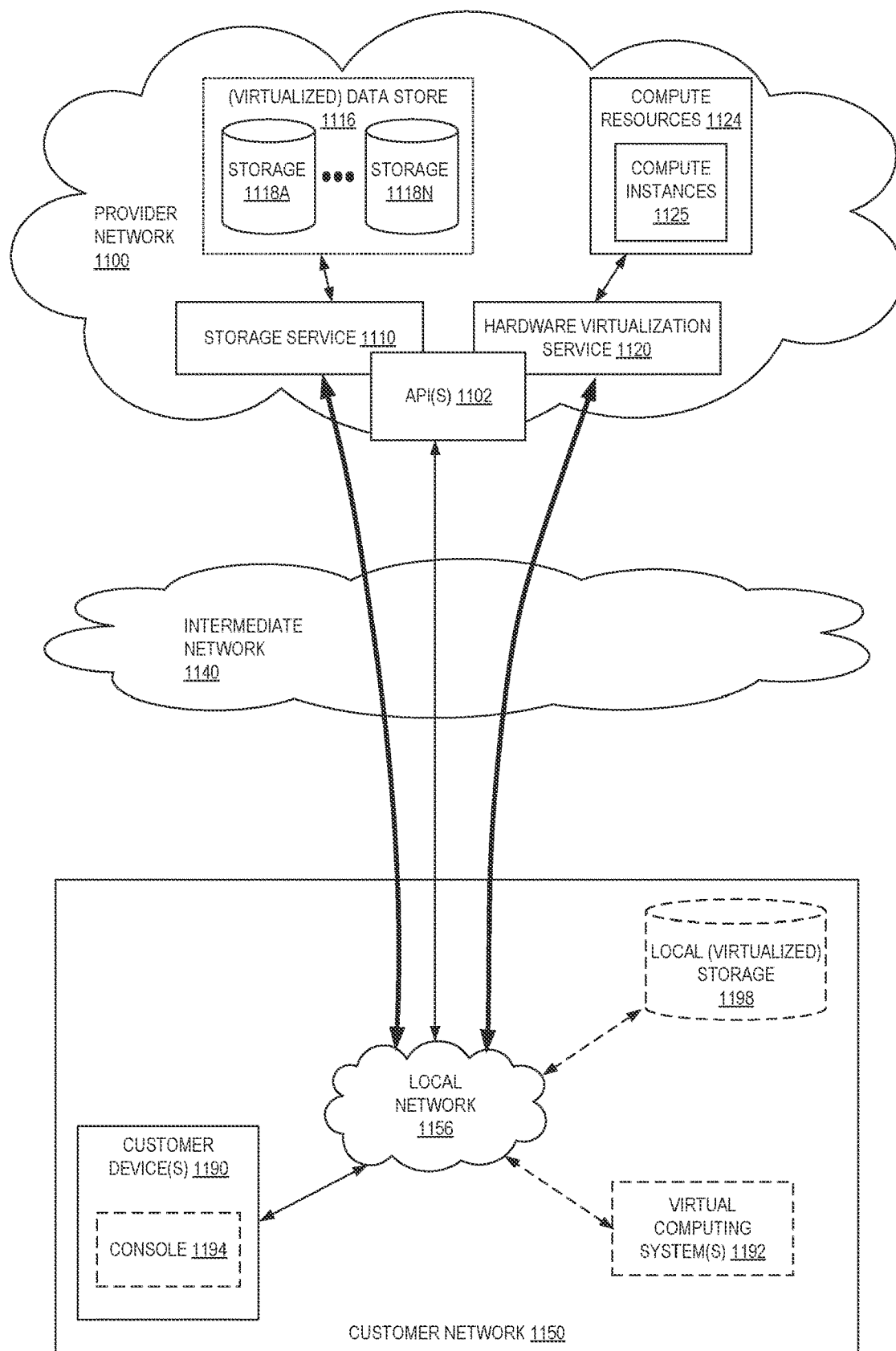
FIG. 11 is a block diagram of an example provider network environment that provides a storage service and a hardware virtualization service to customers, according to some embodiments.

FIG. 11 is a block diagram of an example provider network environment that provides a storage service and a hardware virtualization service to customers, according to some embodiments. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some embodiments, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some embodiments, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some embodiments, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some embodiments, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
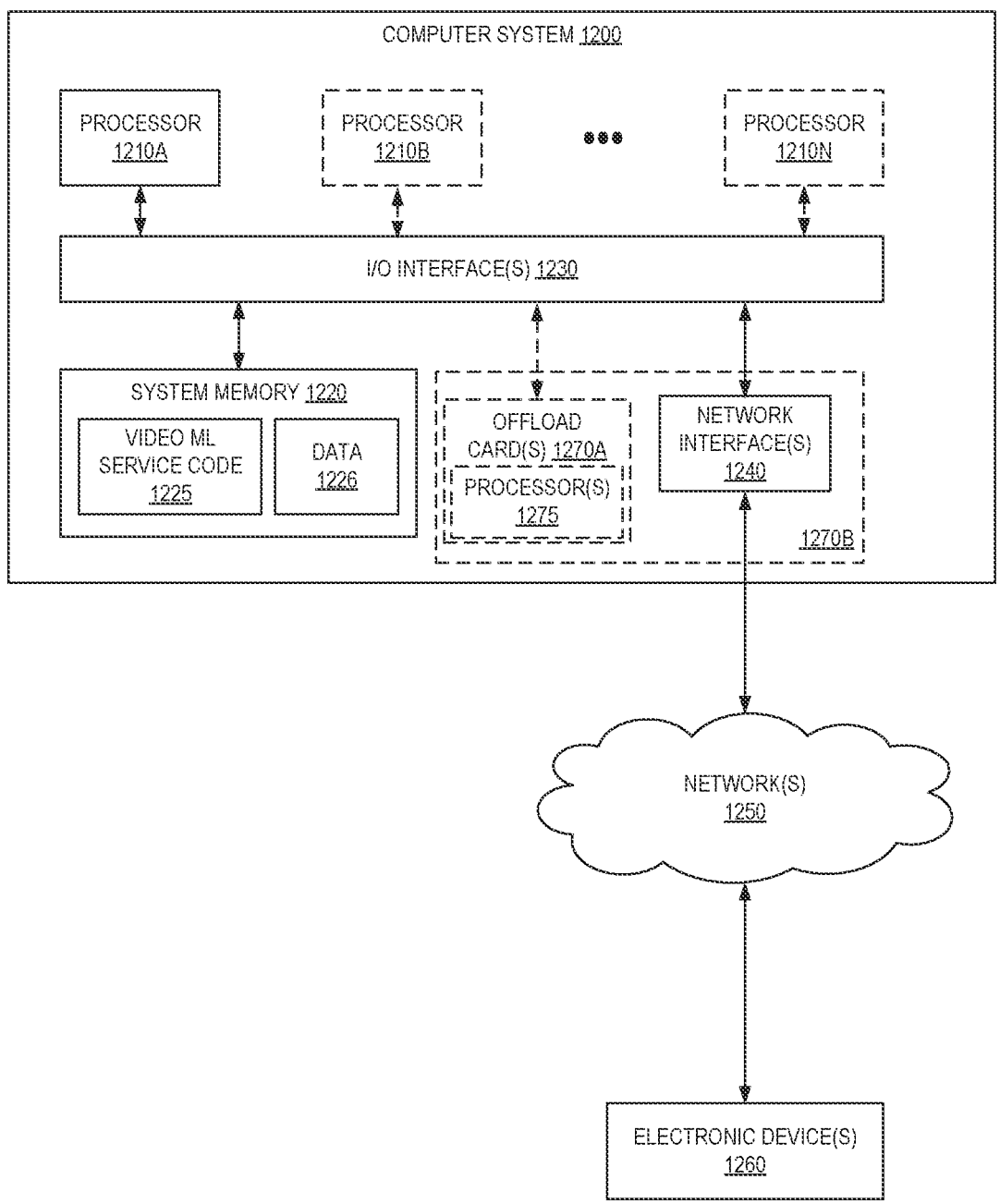
FIG. 12 illustrates embodiments of a system that implements a portion or all of the techniques described herein.

In some embodiments, a system that implements a portion or all of the techniques described herein can include a general-purpose computer system, such as the computer system 1200 illustrated in FIG. 12, that includes, or is configured to access, one or more computer-accessible media. In the illustrated embodiment, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various embodiments the computer system 1200 can include one computing device or any number of computing devices configured to work together as a single computer system 1200.

In various embodiments, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various embodiments, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various embodiments, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1220 as ML video service code 1225 (e.g., executable to implement, in whole or in part, the ML video service 110) and data 1226.

In some embodiments, the I/O interface 1230 can be configured to coordinate I/O traffic between the processor 1210, the system memory 1220, and any peripheral devices in the device, including the network interface 1240 and/or other peripheral interfaces (not shown). In some embodiments, the I/O interface 1230 can perform any necessary protocol, timing, or other data transformations to convert data signals from one component (e.g., the system memory 1220) into a format suitable for use by another component (e.g., the processor 1210). In some embodiments, the I/O interface 1230 can include support for devices attached through various types of peripheral buses, such as a variant of the Peripheral Component Interconnect (PCI) bus standard or the Universal Serial Bus (USB) standard, for example. In some embodiments, the function of the I/O interface 1230 can be split into two or more separate components, such as a north bridge and a south bridge, for example. Also, in some embodiments, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various embodiments, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a Quick- Path interconnect (QPI) or UltraPath interconnect (UPI)). For example, in some embodiments the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations, such as pausing and/or un-pausing compute instances, launching and/or terminating compute instances, performing memory transfer/copying operations, etc. These management operations can, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and cannot coordinate with (or service) any separate hypervisor.

In some embodiments, the system memory 1220 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving a request to pre-train and fine tune a visual neural network;
   training the visual neural network using:
      visual-to-visual contrastive learning according to a first loss function using the visual neural network on a first video clip, a positive video clip extracted from a same video as the first video clip, and a negative video clip extracted from a different video as the first video clip, and
      secondary-to-secondary contrastive learning according to a second loss function using a secondary neural network on secondary positive information and secondary negative information generated from the positive and negative video clips, including applying flow edge maps as inputs to the secondary neural network; and
   applying the first and second loss functions to the visual neural network;
   removing the secondary neural network; and
   fine-tuning the visual neural network only.

2. The computer-implemented method of claim 1, wherein at least one of the first or second loss functions is a Noise-Contrastive Estimation function.

3. The computer-implemented method of claim 1, wherein the request includes one or more of: an identifier of an algorithm or visual neural network model to train, an algorithm or visual neural network model to train, an identifier of a data set to use in the training for positive video(s), an identifier of a data set to use in the training for negative video(s), a data set to use in the training for positive video(s), a data set to use in the training for negative video(s), an indication of how to generate secondary information, an identifier of secondary information, secondary information, an identifier of a secondary algorithm or model to use to handle secondary information, or an indication of how to provide results.

4. A computer-implemented method comprising:
   receiving a request to train a visual neural network;
   training the visual neural network using:
      visual-to-visual contrastive learning according to a first loss function using the visual neural network on a first video clip, a positive video clip extracted from a same video as the first video clip, and a negative video clip extracted from a different video as the first video clip, and secondary-to-secondary contrastive learning according to a second loss function using a secondary neural network on secondary positive information and secondary negative information generated from the positive and negative video clips, including applying flow edge maps as inputs to the secondary neural network; and applying the first and second loss functions to the visual neural network.

5. The computer-implemented method of claim 4, wherein the first loss function is an InfoNoise-Contrastive Estimation function and the positive and negative video clips are clips with spatiotemporal jittering.

6. The computer-implemented method of claim 4, wherein the second loss function is an InfoNoise-Contrastive Estimation function and the secondary positive information and the secondary negative information generated from the positive and negative video clips is sampled in temporal regions having strong secondary cues.

7. The computer-implemented method of claim 4, wherein the first and second loss functions are applied as a sum of loss functions.

8. The computer-implemented method of claim 4, further comprising:
disregarding the secondary neural network.

9. The computer-implemented method of claim 4, further comprising:
fine-tuning the visual neural network using an action recognition dataset.

10. The computer-implemented method of claim 4, further comprising:
fine-tuning the visual neural network using an action detection dataset.

11. The computer-implemented method of claim 4, wherein the secondary positive information and the secondary negative information is motion information.

12. The computer-implemented method of claim 4, wherein the visual neural network is a ResNet architecture.

13. The computer-implemented method of claim 4, wherein the request includes one or more of: an identifier of an algorithm or visual neural network model to train, an algorithm or visual neural network model to train, an identifier of a data set to use in the training for positive video(s), an identifier of a data set to use in the training for negative video(s), a data set to use in the training for positive video(s), a data set to use in the training for negative video(s), an indication of how to generate secondary information, an identifier of secondary information, secondary information, an identifier of a secondary algorithm or model to use to handle secondary information, and an indication of how to provide results.

14. A system comprising:
a first one or more electronic devices storing a first video clip, a positive video clip extracted from a same video as the first video clip, and a negative video clip extracted from a different video as the first video clip; and a second one or more electronic devices to implement a video machine learning model training service in a multi-tenant provider network, the video machine learning model training service including instructions that upon execution by one or more processors cause the video machine learning model training service to:
receive a request to train a visual neural network;
train the visual neural network using:
visual-to-visual contrastive learning according to a first loss function using the visual neural network on the first video clip, the positive video clip, and the negative video clip stored in the first one or more electronic devices, and
secondary-to-secondary contrastive learning according to a second loss function using a secondary neural network on secondary positive information and secondary negative information generated from the positive and negative video clips stored in the first one or more electronic devices, including applying flow edge maps as inputs to the secondary neural network; and
apply the first and second loss functions to the visual neural network.

15. The system of claim 14, wherein the first loss function is an InfoNoise-Contrastive Estimation function and the positive and negative video clips are clips with spatiotemporal jittering.

16. The system of claim 14, wherein the second loss function is an InfoNoise-Contrastive Estimation function and the secondary positive information and the secondary negative information generated from the positive and negative video clips is sampled in temporal regions having strong secondary cues.

17. The system of claim 14, wherein the first and second loss functions are applied as a sum of loss functions.

18. The system of claim 14, wherein the request includes one or more of: an identifier of an algorithm or visual neural network model to train, an algorithm or visual neural network model to train, an identifier of a data set to use in the training for positive video(s), an identifier of a data set to use in the training for negative video(s), a data set to use in the training for positive video(s), a data set to use in the training for negative video(s), an indication of how to generate secondary information, an identifier of secondary information, secondary information, an identifier of a secondary algorithm or model to use to handle secondary information, and an indication of how to provide results.

19. The system of claim 14, wherein applying flow edge maps as inputs to the secondary neural network comprises applying a Sobel filter onto a flow magnitude map to produce the flow edges.

20. The computer-implemented method of claim 4, wherein applying flow edge maps as inputs to the secondary neural network comprises applying a Sobel filter onto a flow magnitude map to produce the flow edges.

* * * * *